(12) United States Patent
Yamane et al.

(10) Patent No.: US 7,263,964 B2
(45) Date of Patent: Sep. 4, 2007

(54) OIL SENSOR MOUNTING STRUCTURE

(75) Inventors: Kaduto Yamane, Saitama (JP); Masato Matsuki, Saitama (JP); Toshio Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/517,584

(22) Filed: Sep. 8, 2006

(65) Prior Publication Data
US 2007/0057675 A1   Mar. 15, 2007

(30) Foreign Application Priority Data
Sep. 9, 2005   (JP) .............. 2005-261588
Sep. 9, 2005   (JP) .............. 2005-261589

(51) Int. Cl.
*F01M 11/10*   (2006.01)
(52) U.S. Cl. .............. 123/196 S; 123/198 E; 123/195 C
(58) Field of Classification Search ........... 123/196 R, 123/196 S, 198 DA, 195 C, 198 E
See application file for complete search history.

(56) References Cited

U.S. PATENT DOCUMENTS 5,046,583 A * 9/1991 Sasaki et al. ............. 184/6.4
5,097,703 A * 3/1992 Peter ..................... 73/304 C
5,196,824 A * 3/1993 Helm ..................... 340/450.3
5,687,687 A * 11/1997 Trueblood et al. ........ 123/196 S
5,872,509 A * 2/1999 Kim ..................... 340/450.3
6,052,896 A * 4/2000 Howell et al. .......... 29/888.011
6,378,167 B1* 4/2002 Howell et al. .............. 16/2.1
6,791,334 B2* 9/2004 Horie et al. ............... 324/438
7,043,983 B2* 5/2006 Fling et al. ............... 73/313
2003/0041659 A1* 3/2003 Marszalek et al. ........ 73/119 R

FOREIGN PATENT DOCUMENTS

JP   2003-83935 A   3/2003

* cited by examiner

*Primary Examiner*—Hai Huynh
(74) *Attorney, Agent, or Firm*—Arent Fox LLP (57) ABSTRACT

Of a sensing part and a mounting part of an oil level sensor mounted to a sensor mounting opening at a bottom portion of an oil pan of an engine, an undersurface of the mounting part exposed to the outside of the oil pan is located above the lowest part of the oil pan by a distance, and the mounting part is disposed in a recessed part formed on an undersurface of the oil pan and is covered with a cover plate. Therefore, the weight of the engine does not directly act on the mounting part of the oil level sensor when the engine is directly placed on a floor surface. Further, even in a state in which the engine is mounted on a vehicle body, the mounting part of the oil level sensor can be also effectively protected at the time of colliding with a flying stone, riding on a curbstone, jacking up or the like.

19 Claims, 7 Drawing Sheets

OIL SENSOR MOUNTING STRUCTURE

RELATED APPLICATION DATA

The present invention is based upon Japanese priority application Nos. 2005-261588 and 2005-261589, which are hereby incorporated in their entirety herein by reference.

BACKGROUND OF THE INVENTION

1. Field of the Invention

The present invention relates to a mounting structure of an oil sensor for mounting the oil sensor which detects a parameter of engine oil to a sensor mounting opening provided at a bottom portion of an oil pan which is located below a cylinder block of an engine and stores the engine oil.

2. Description of the Related Art

Japanese Patent Application Laid-open No. 2003-83935 discloses a structure including an oil deterioration sensor which detects the deterioration degree of engine oil based on a pH value and which is disposed at a bottom portion of an oil pan in order to determine the replacement time of the engine oil of an automobile engine. The oil deterioration sensor includes a sensing part which accommodates therein a sensing element, and a mounting part which supports the sensing part; and the sensing part is inserted upward from an opening formed at the bottom portion of the oil pan, and the mounting part is fixed to the bottom portion of the oil pan.

However, in this conventional structure, the entire mounting part of the oil deterioration sensor protrudes downward from the flat bottom portion of the oil pan, and therefore, not only the weight of the engine is likely to directly act on the oil deterioration sensor when the engine is directly placed on the floor surface, but also there is a possibility that the oil deterioration sensor cannot be sufficiently protected at the time of colliding with a flying stone, riding on a curbstone, jacking up or the like in a state in which the engine is mounted on a vehicle body.

SUMMARY OF THE INVENTION

The present invention has been achieved in view of the above described circumstances, and has an object to protect an oil sensor provided at a bottom portion of an oil pan of an engine.

In order to achieve the above object, according to a first feature of the present invention, there is provided an oil sensor mounting structure in which an oil sensor which detects a parameter of engine oil is mounted to a sensor mounting opening provided at a bottom portion of an oil pan which is located below a cylinder block of an engine and stores the engine oil; and the oil sensor comprises a sensing part accommodated inside the oil pan, and a mounting part which is exposed to the outside of the oil pan, wherein the mounting part of the oil sensor is covered with a cover.

With this arrangement, of the sensing part and the mounting part of the oil sensor mounted to the sensor mounting opening at the bottom portion of the oil pan, the mounting part exposed to the outside of the oil pan is covered with the cover. Therefore, when the engine is directly placed on a floor surface, the weight of the engine does not directly act on the mounting part of the oil sensor, and even in a state in which the engine is mounted on a vehicle body, the mounting part of the oil sensor can be effectively protected at the time of colliding with a flying stone, riding on a curbstone, jacking up or the like.

According to a second feature of the present invention, there is provided an oil sensor mounting structure in which an oil sensor which detects a parameter of engine oil is mounted to a sensor mounting opening provided at a bottom portion of an oil pan which is located below a cylinder block of an engine and stores the engine oil; and the oil sensor comprises a sensing part accommodated inside the oil pan, and a mounting part which is exposed to the outside of the oil pan, wherein an undersurface of the mounting part of the oil sensor is located at a position higher than the lowest part of the oil pan.

With this arrangement, of the sensing part and the mounting part of the oil sensor mounted to the sensor mounting opening of the bottom portion of the oil pan, the undersurface of the mounting part exposed to the outside of the oil pan is located at the position higher than the lowest part of the oil pan. Therefore, when the engine is directly placed on the floor surface, the weight of the engine does not directly act on the mounting part of the oil sensor, and even in a state in which the engine is mounted on the vehicle body, the mounting part of the oil sensor can be effectively protected at the time of colliding with a flying stone, riding on a curbstone, jacking up or the like.

According to a third feature of the present invention, there is provided an oil sensor mounting structure in which an oil sensor which detects a parameter of engine oil is mounted to a sensor mounting opening provided at a bottom portion of an oil pan which is located below a cylinder block of an engine and stores the engine oil; and the oil sensor comprises a sensing part accommodated inside the oil pan, and a mounting part which is exposed to the outside of the oil pan, wherein an undersurface of the mounting part of the oil sensor is located at a position higher than the lowest part of the oil pan; and wherein a rib is projectingly provided on an undersurface of the oil pan to surround a side portion in a mounting direction of the mounting part of the oil sensor over a substantially entire circumference.

With this arrangement, of the sensing part and the mounting part of the oil sensor mounted to the sensor mounting opening of the bottom portion of the oil pan, the undersurface of the mounting part exposed to the outside of the oil pan is located at the position higher than the lowest part of the oil pan, and the rib is projectingly provided on the undersurface of the oil pan to surround the side portion in the mounting direction of the mounting part of the oil pan over the substantially entire circumference. Therefore, when the engine is directly placed on the floor surface, the weight of the engine does not directly act on the mounting part of the oil sensor, and even in a state in which the engine is mounted on the vehicle body, the mounting part of the oil sensor can be effectively protected at the time of colliding with a flying stone, riding on a curbstone, jacking up or the like.

According to a fourth feature of the present invention, in addition to the third feature, the mounting part of the oil sensor is covered with a cover.

With this arrangement, the mounting part of the oil sensor is covered with the cover, and therefore, the mounting part can be more effectively protected.

According to a fifth feature of the present invention, in addition to the fourth feature, an undersurface of the cover and an undersurface of the lowest part of the oil pan are substantially located on the same plane.

With this arrangement, the undersurface of the cover and the undersurface of the lowest part of the oil pan are substantially located on the same plane, and therefore, the posture can be stabilized when the engine is directly placed on the floor.

According to a sixth feature of the present invention, in addition to any of the first to fifth features, an oil hole, into which engine oil flows, is provided in the vicinity of a lower end portion of the sensing part, the oil hole being located at a position lower than an upper edge of the sensor mounting part which surrounds the sensor mounting opening; and an oil release groove is formed in the sensor mounting part so that its upstream end communicates with the sensor mounting opening at a position lower than the oil hole, and its downstream end communicates with the bottom portion of the oil pan at a position lower than a lower end of the sensor mounting opening.

With this arrangement, the oil hole is provided in the vicinity of the lower end portion of the sensing part of the oil sensor fixed to the bottom portion of the oil pan, the oil hole being located at a position lower than the upper edge of the sensor mounting part which surrounds the sensor mounting opening; and the oil release groove is formed in the sensor mounting part so that its upstream end communicates with the sensor mounting opening at the position lower than the oil hole, and its downstream end communicates with the bottom portion of the oil pan at the position lower than the lower end of the sensor mounting opening. Therefore, when the engine oil in the oil pan is drained, the engine oil, which remains in the sensor mounting opening surrounded by the sensor mounting part, can be discharged through the oil release groove, and a foreign substance such as sludge can be prevented from remaining in the sensor mounting opening.

According to a seventh feature of the present invention, in addition to the sixth feature, the oil release groove monotonously inclines downward from the upstream end on the sensor mounting opening side to the downstream end.

With this arrangement, the oil release groove monotonously inclines downward from the upstream end on the sensor mounting opening side to the downstream end. Therefore, it is possible to smoothly discharge through the oil release groove the engine oil which resides in the sensor mounting opening with a foreign substance such as sludge contained therein.

The oil level sensor 12 of an embodiment corresponds to the oil sensor of the present invention, and the cover plate 17 of the embodiment corresponds to the cover of the present invention.

The above-mentioned object, other object, characteristics, and advantages of the present invention will become apparent from a preferred embodiment, which will be described in detail below with reference to the attached drawings.

BRIEF DESCRIPTION OF THE DRAWINGS

FIGS. 1 to 7 show one embodiment of the present invention.

DESCRIPTION OF THE PREFERRED EMBODIMENT

An oil pan 11 is mounted to a bottom surface of a cylinder block 10 (see FIG. 1) of an engine of an automobile. The oil pan 11 is a vessel type member including a mounting surface 11a with respect to the cylinder block 10 at a peripheral edge of an opening of its top surface. An oil level sensor 12 for detecting an oil level in the oil pan 11 is provided at one end side in a longitudinal direction of the oil pan 11.

In the bottom portion of the oil pan 11, a lowest part 11b which is the lowest in height is provided at a central portion in the longitudinal direction. A sensor mounting part 11c is provided at a position which is adjacent to the lowest part 11b and is raised by one step higher. The sensor mounting part 11c is thick as compared with the other parts of the bottom surface of the oil pan 11 including the lowest part 11b, and a circular sensor mounting opening 11d is formed in the center of the sensor mounting part 11c. An oil drain hole 11e for draining the engine oil in the oil pan 11 is formed in the vicinity of the side opposite from the sensor mounting part 11c with the lowest part 11b therebetween.

On an undersurface of the oil pan 11, an annular rib 11f is projectingly provided so as to surround a periphery of the sensor mounting opening 11d, and bosses 11g are formed at four spots of the rib 11f. Three bosses 11h are projectingly provided on a top surface of the oil pan 11 to surround the periphery of the sensor mounting opening 11d. Further, on the top surface of the oil pan 11, an oil release groove 11i having a trapezoidal section is formed to cross the thick sensor mounting part 11c which surrounds the periphery of the sensor mounting opening 11d. The height of an upstream end of the oil release groove 11i, which communicates with the sensor mounting opening 11d, is lower than the height of an oil hole 19a of a cover member 19 of a sensing part 14. The height of a downstream end of the oil release groove 11i which opens toward the lowest part 11b of the oil pan 11 is lower than the bottom of the sensor mounting opening 11d.

The oil level sensor 12 includes a mounting part 13 which is formed into a hexagonal box shape in plane view, and the sensing part 14 having a shape of a tower extending upward from the center of the mounting part 13. In a state in which the outer peripheral surfaces of three projections 13a projectingly provided on a top surface of the mounting part 13 so as to surround the sensing part 14 are fitted in the sensor mounting opening 11d of the oil pan 11, three bolts 15 penetrating from below through the mounting part 13 are threadedly fitted into the three bosses 11h surrounding the periphery of the sensor mounting opening 11d, whereby the oil level sensor 12 is fixed to the oil pan 11. At this time, a seal member 16 for preventing leakage of the engine oil is sandwiched between the undersurface of the outer peripheral portion of the sensor mounting opening 11d and the top surface of the mounting part 13 of the oil level sensor 12.

A plate-shaped cover plate 17 abuts on the lower end of the annular rib 11f projectingly provided on the undersurface of the oil pan 11, and is fixed thereto with four bolts 18 which are threadedly fitted in the four bosses 11g. Accordingly, the mounting part 13 of the oil level sensor 12 is accommodated in a recessed part 11j surrounded by the sensor mounting part 11c and the rib 11f of the oil pan 11, and is covered with the cover plate 17 from below. Four water draining holes 17a are formed in the cover plate 17.

The sensing part 14 of the oil level sensor 12 includes a hollow cover member 19. An oil hole 19a in a slit shape laterally longer (see FIG. 4) for communication with the engine oil in the oil pan 11 is formed at a lower end of the cover member 19. An air hole 19b (see FIG. 4) for communication with air in the oil pan 11 is formed at an upper end of the cover member 19. Therefore, the oil level in the cover member 19 of the sensing part 14 moves up and down corresponding to the oil level in the oil pan 11.

A plate-shaped sensing element 20 (see FIG. 4) is disposed inside the cover member 19 of the sensing part 14 of the oil level sensor 12. The sensing element 20 is energized to generate heat so that the sensing element 20 has a temperature higher by, for example, 10° C. than the oil temperature, and the time elapsing before the temperature decreases by, for example, 5° C. is measured. When the oil level is high, heat radiation from the sensing element 20 to the engine oil is promoted, and the temperature drops fast. On the other hand, when the oil level is low, heat radiation from the sensing element 20 to the engine oil is suppressed and the temperature slowly decreases. With this mechanism, the oil level in the oil pan 11 can be detected.

Figure 6:
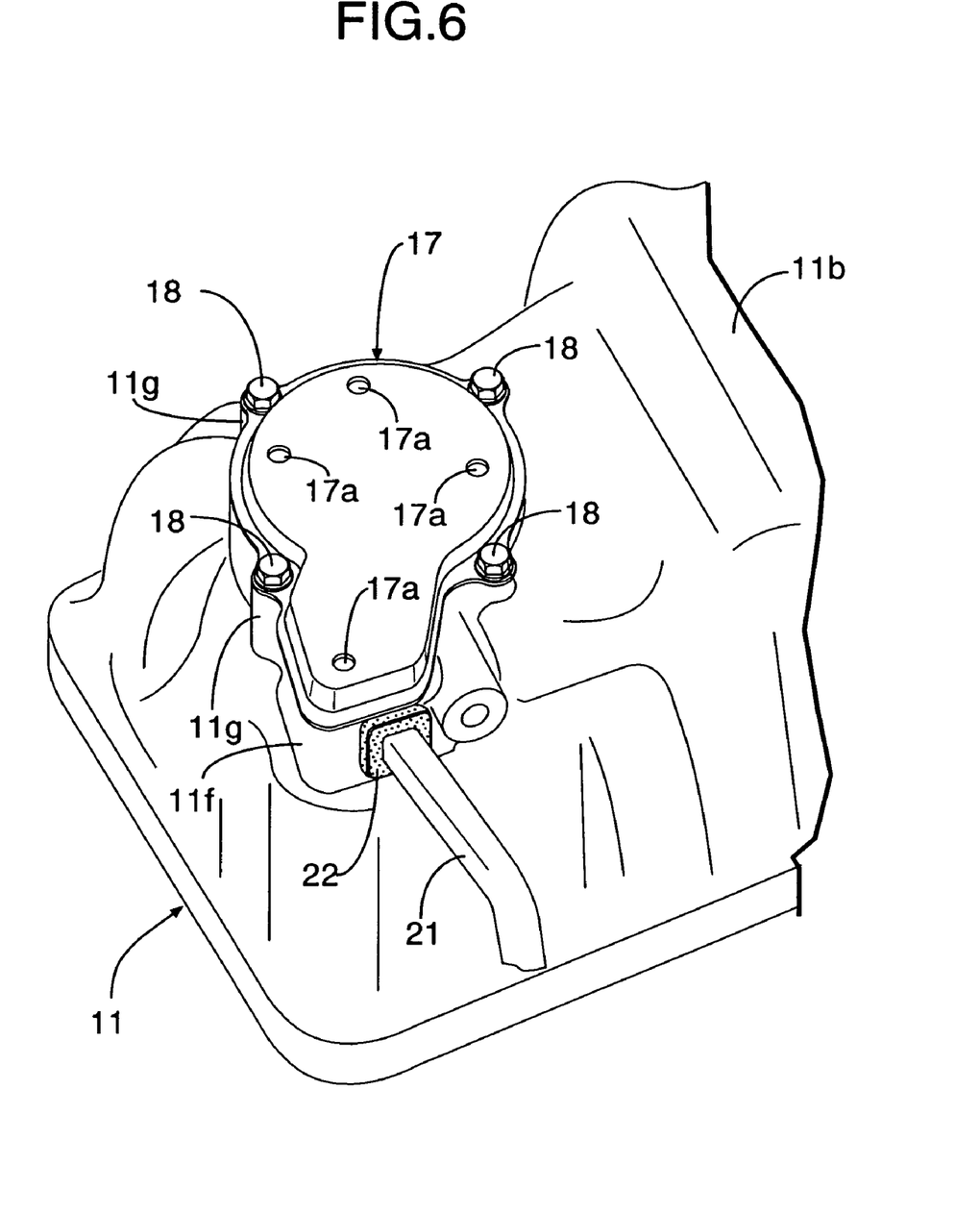
FIG. 6 is a view seen from the direction of arrow 6 in FIG. 2.
Figure 7:
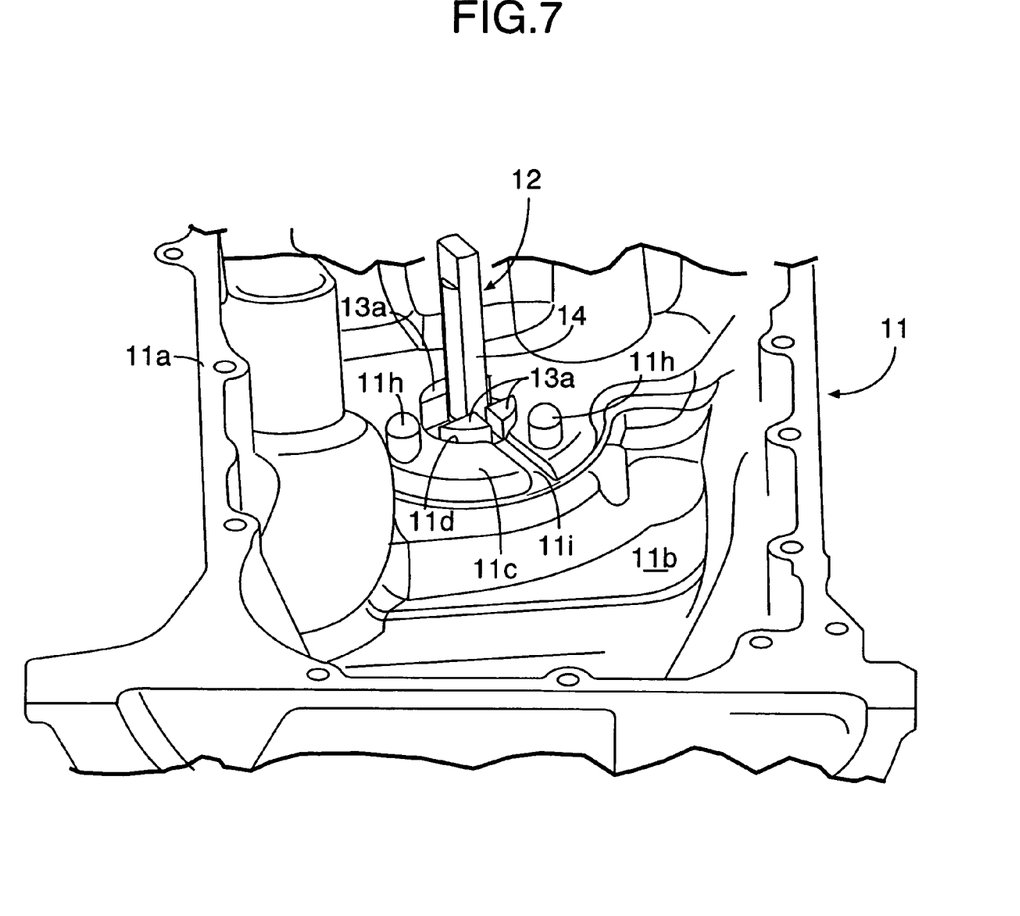
FIG. 7 is a view seen from the direction of arrow 7 in FIG. 3.

A harness 21 (see FIG. 6) extending from the mounting part 13 of the oil level sensor 12 penetrates through a grommet 22 (see FIG. 6) which is fitted in a notch of the rib 11f of the oil pan 11, and is drawn to the outside.

Figure 1:
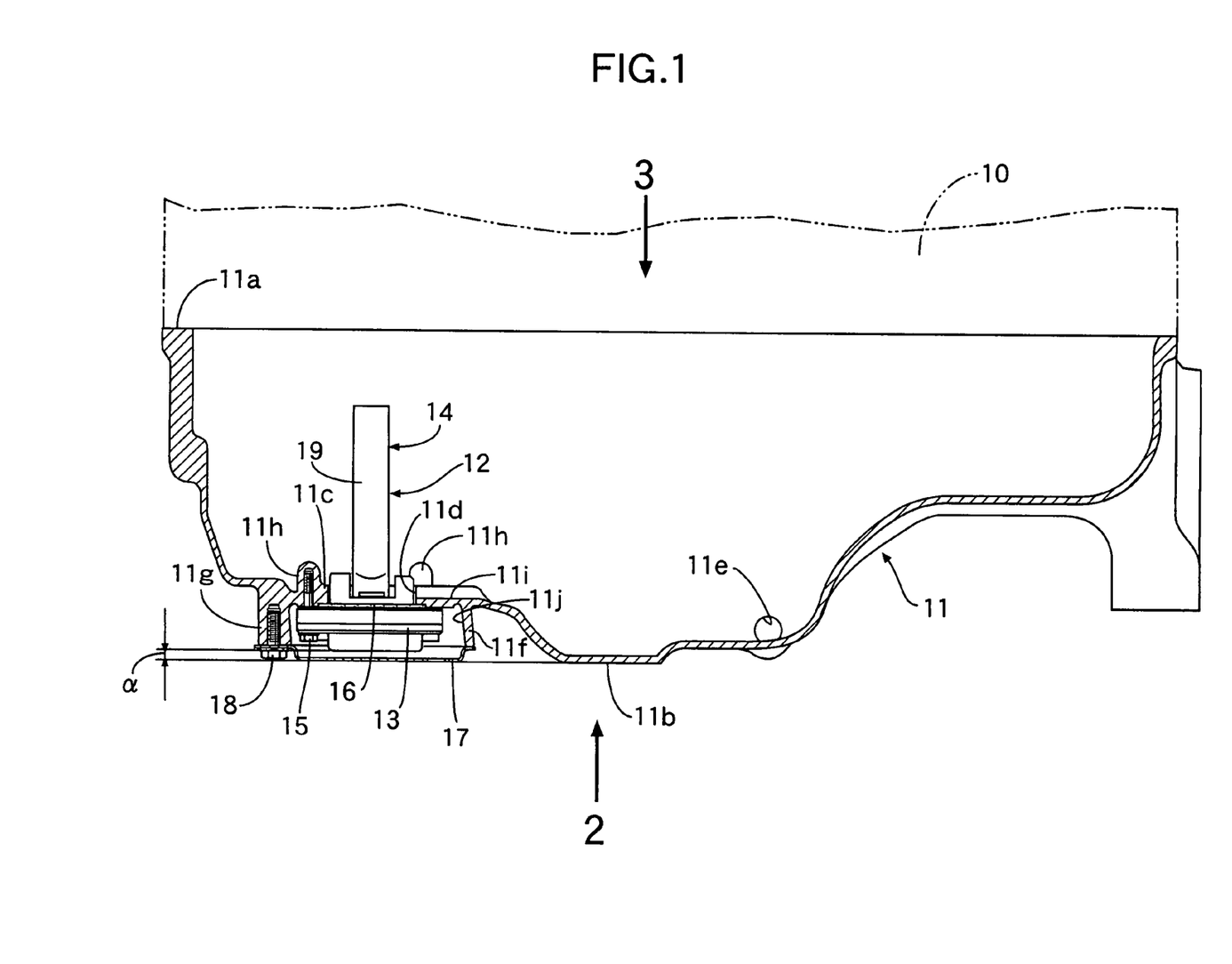
FIG. 1 is a vertical sectional view of an oil pan of an engine (sectional view taken along line 1-1 in FIG. 3).
Figure 2:
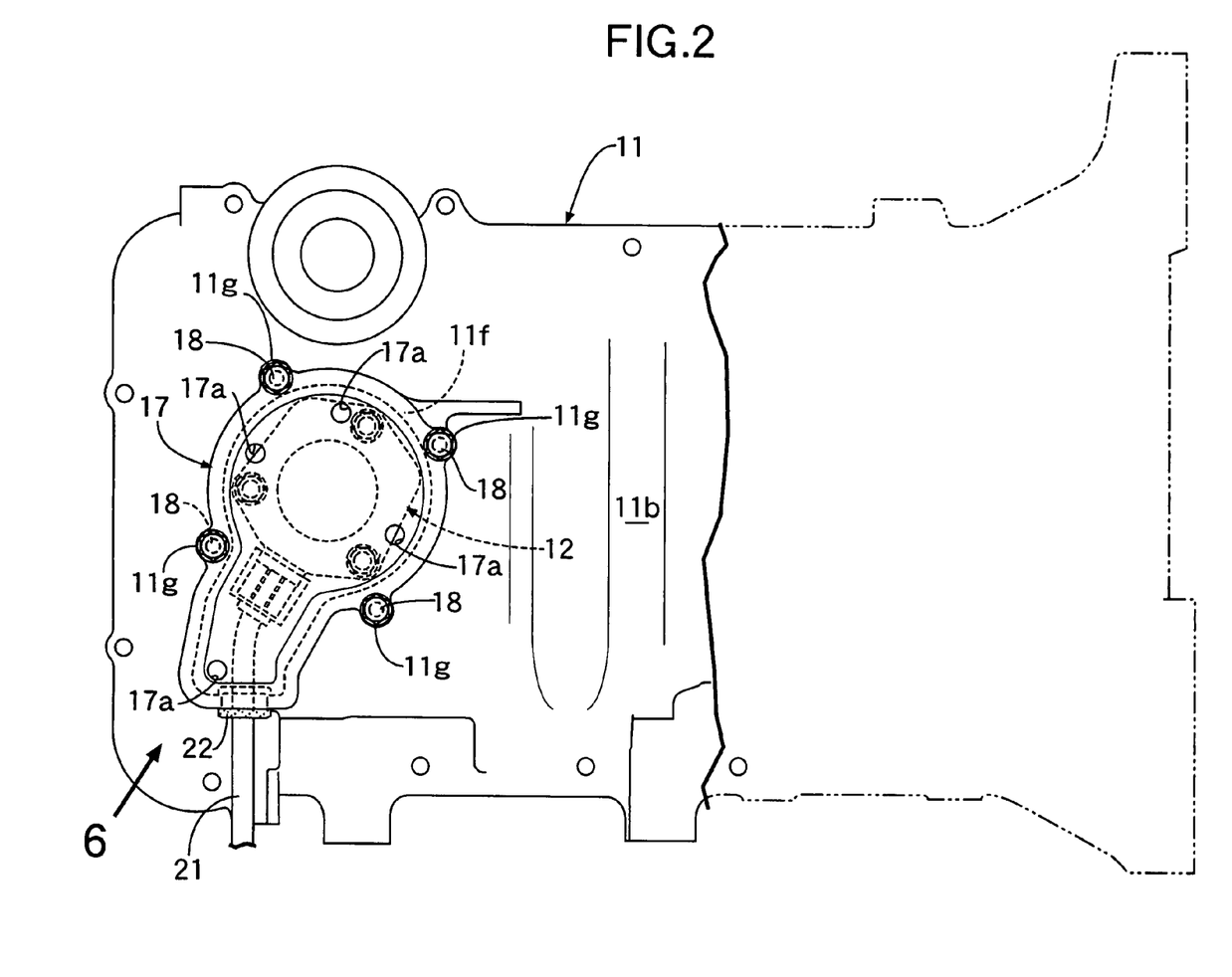
FIG. 2 is a view showing an undersurface of the oil pan (view seen from the direction of arrow 2 in FIG. 1).
Figure 3:
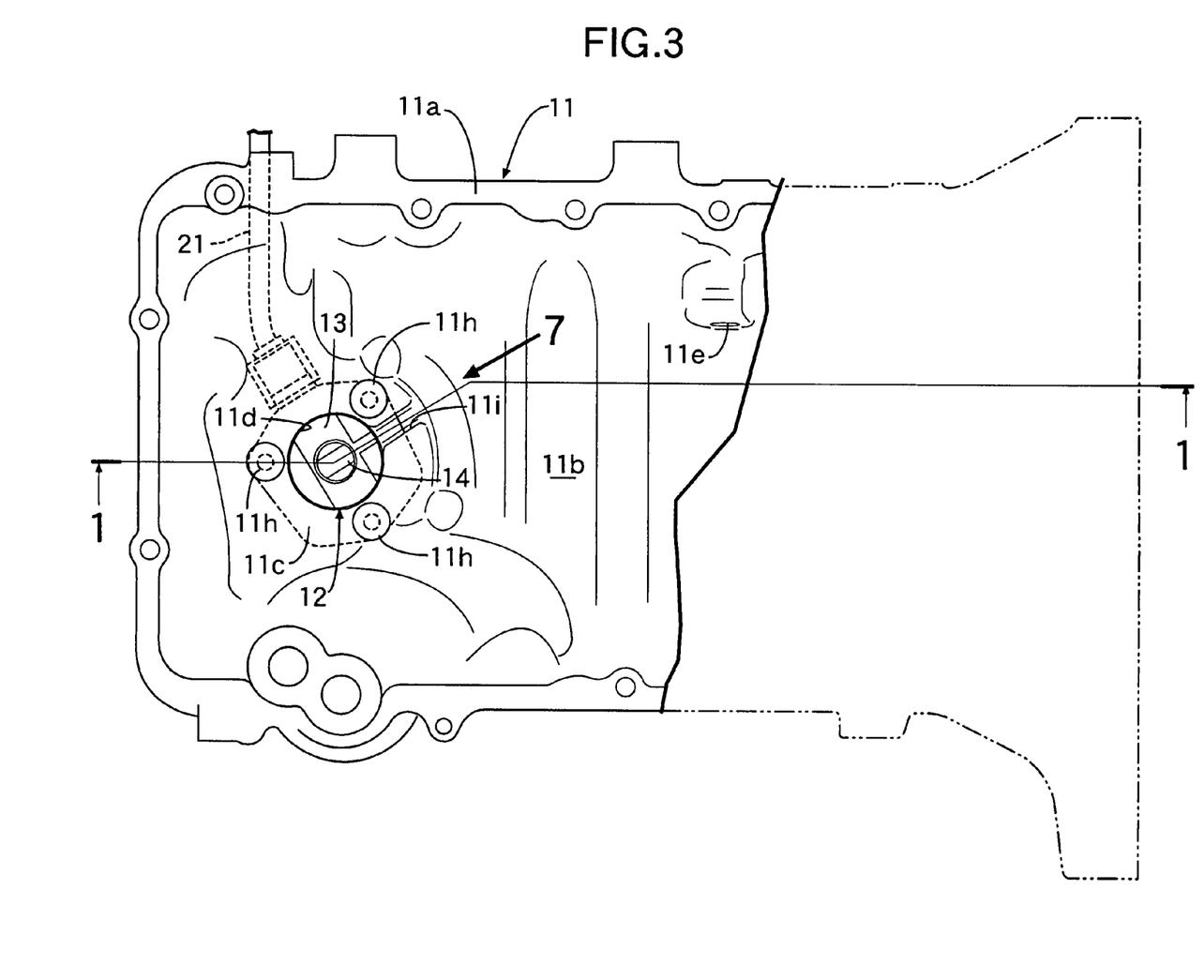
FIG. 3 is a view showing a top surface of the oil pan (view seen from the direction of arrow 3 in FIG. 1).
Figure 4:
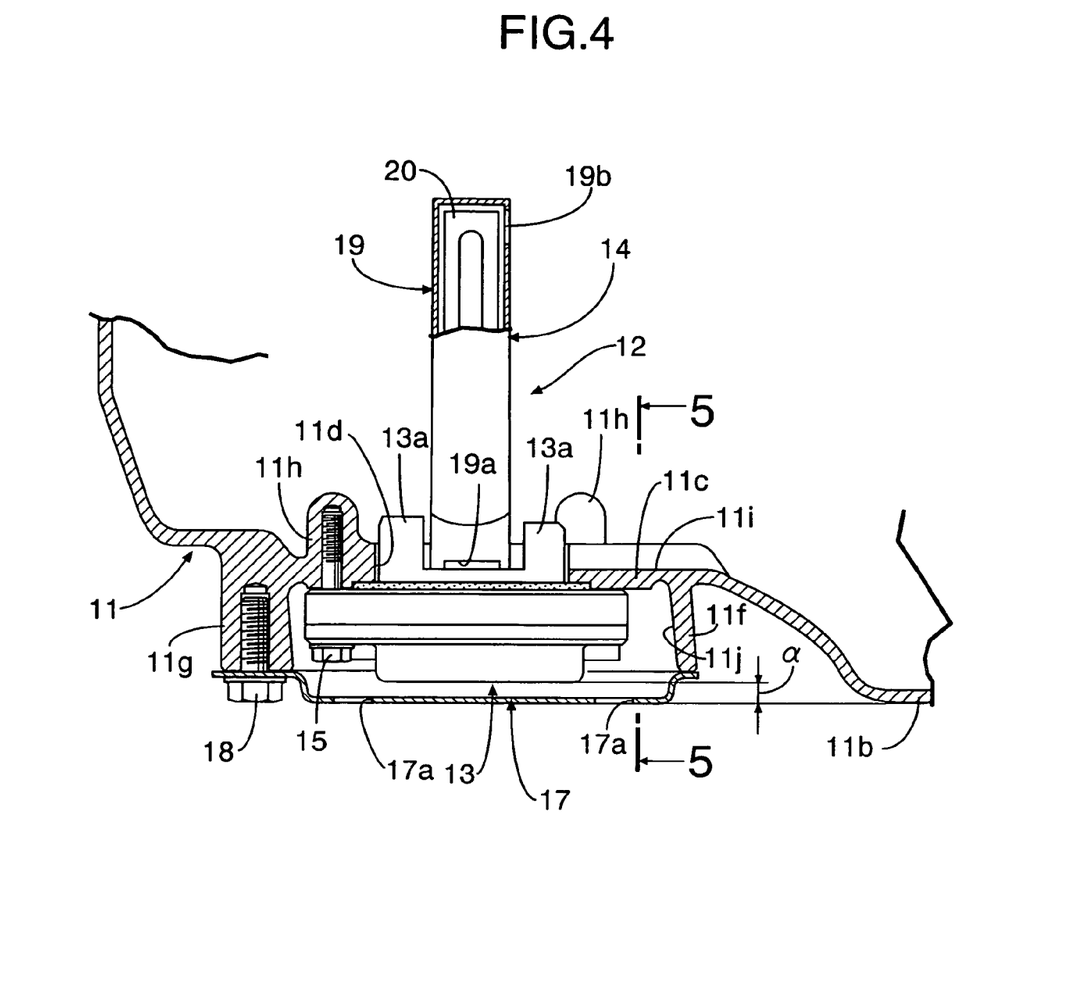
FIG. 4 is an enlarged view of a main part in FIG. 1.
Figure 5:
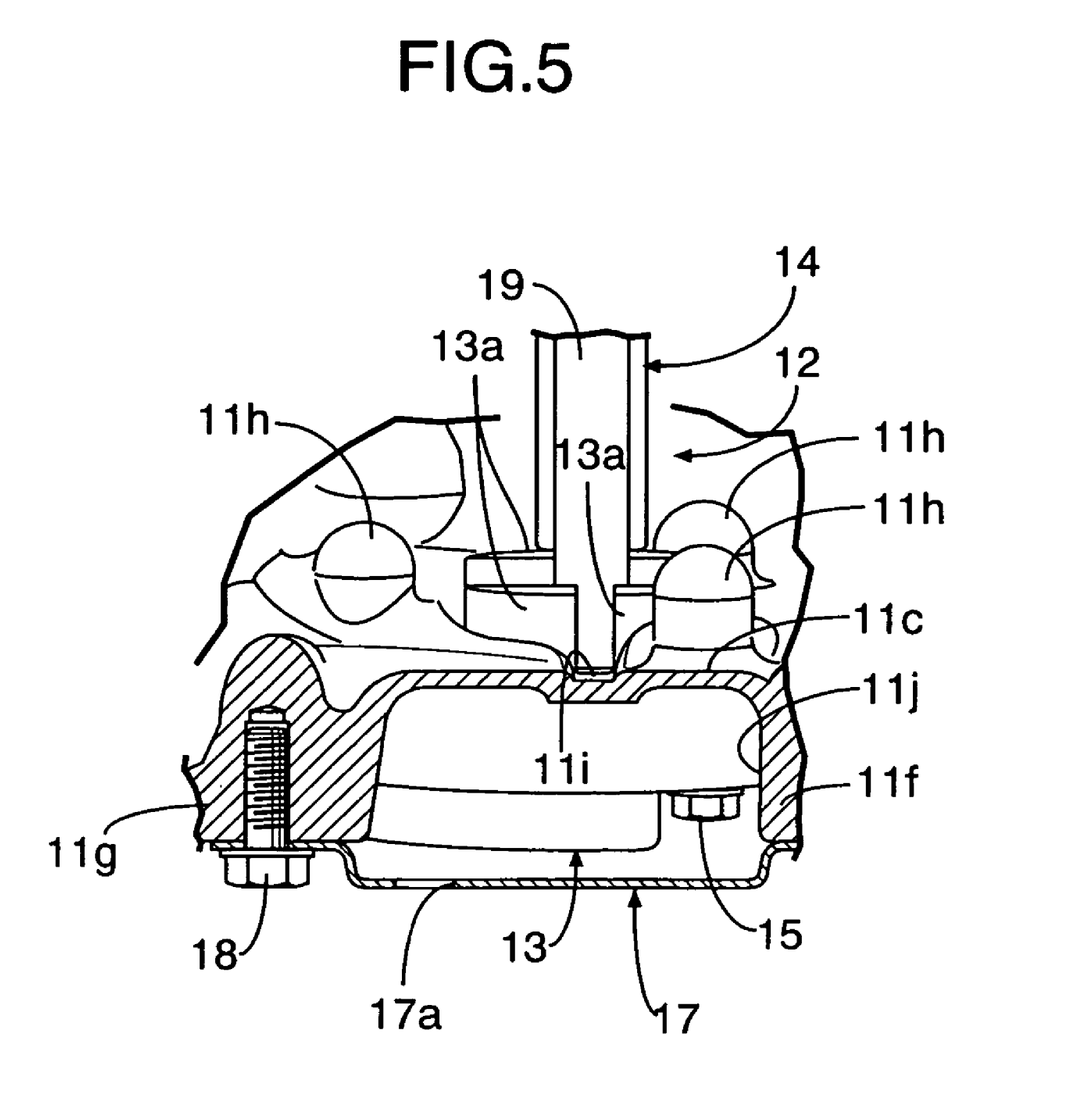
FIG. 5 is a sectional view taken along line 5-5 in FIG. 4.

As is obvious from FIGS. 1 and 4, the lowest part (the undersurface of the mounting part 13) of the oil level sensor 12 is located at a position higher by a distance α with respect to the undersurface of the lowest part 11b of the oil pan 11; the mounting part 13 of the oil level sensor 12, which is exposed from the undersurface of the oil pan 11, is housed in the recessed part 11j, with its outer periphery surrounded by the rib 11f; and the undersurface of the mounting part 13 of the oil level sensor 12 is covered with the cover plate 17. With this arrangement, when the engine is directly placed on the floor surface, the weight of the engine can be prevented from directly acting on the mounting part 13 of the oil level sensor 12, and at the time of colliding with a flying stone, riding on a curbstone, jacking up or the like in a state in which the engine is mounted on the vehicle body, the mounting part 13 of the oil level sensor 12 can be protected from being damaged.

The undersurface of the lowest part 11b of the oil pan 11 and the undersurface of the cover plate 17 are at the same height and are located on the same plane, and therefore, when the engine is directly placed on the floor surface, the weight of the engine are supported by the undersurface of the lowest part 11b of the oil pan 11 and the undersurface of the cover plate 17, thereby stabilizing the posture of the engine.

When the engine oil in the oil pan 11 is drained from the oil drain hole 11e for replacement, the engine oil is likely to remain inside the sensor mounting opening 11d surrounded by the thick sensor mounting part 11c. If the remaining engine oil contains a foreign substance such as sludge, the oil hole 19a of the cover member 19 of the sensing part 14 is likely to be clogged with the foreign substance. However, according to this embodiment, the oil release groove 11i is formed on the thick sensor mounting part 11c which surrounds the sensor mounting opening 11d. Therefore, the engine oil remaining inside the sensor mounting opening 11d is caused to flow out to the lowest part 11b through the oil release groove 11i, and can be discharged out of the oil pan 11 from the oil drain hole 11e formed in the vicinity of the lowest part 11b. Particularly because the oil release groove 11i monotonously inclines downward from the sensor mounting opening 11d to the lowest part 11b, the foreign substance can be effectively discharged.

The embodiment of the present invention has been described in detail above, but various design changes can be made thereto without departing from the subject matter of the present invention.

For example, in the embodiment, the oil level sensor 12 which detects the level of the engine oil is described, but the present invention is applicable to any other oil sensors which detect the temperature or deterioration degree of engine oil.

What is claimed is:

1. An oil sensor mounting structure wherein an oil sensor which detects a parameter of engine oil is mounted, the oil sensor mounting structure comprising:
    a sensor mounting opening provided at a bottom portion of an oil pan located below a cylinder block of an engine, wherein the oil sensor is mounted to the sensor mounting opening, wherein the oil pan stores the engine oil therein, and wherein the oil sensor comprises a sensing part accommodated inside the oil pan, and a sensor mounting part exposed to an outside of the oil pan;
    a mounting part provided at the sensor mounting opening and which is exposed to the outside of the oil pan wherein an undersurface of the sensor mounting part is located at a position higher than a lowest part of the oil pan; and
    a rib integrally provided on and projecting away from an undersurface of the oil pan.

2. The mounting structure of an oil sensor according claim 1, wherein the mounting part of the oil sensor is covered with a cover.

3. The mounting structure of an oil sensor according to claim 2, wherein an undersurface of the cover and an undersurface of the lowest part of the oil pan are substantially located on the same plane.

4. The mounting structure of an oil sensor according to claim 2, wherein the cover abuts a lower end of the rib.

5. The mounting structure of an oil sensor according to claim 1, wherein an oil hole is defined in a lower end portion of the sensing part and is located at a position lower than an upper edge of the sensor mounting part.

6. The mounting structure of an oil sensor according to claim 1, wherein the mounting part includes an oil release groove, which is formed to incline in a downward direction in the mounting part.

7. The mounting structure of an oil sensor according to claim 6, wherein the oil release groove inclines continuously in the downward direction.

8. The mounting structure of an oil sensor according to claim 6, wherein the oil release groove has a trapezoidal cross-sectional shape.

9. The mounting structure of an oil sensor according to claim 6, further comprising an oil drain hole defined in the bottom portion of the oil pan, wherein an upstream end of the oil release groove is lower than the oil drain hole.

10. The mounting structure of an oil sensor according to claim 6, wherein a downstream end of the oil release groove is lower than a bottom of the sensor mounting opening.

11. The mounting structure of an oil sensor according to claim 1, wherein there is a distance defined between an undersurface of the cover and an undersurface of the oil sensor.

12. The mounting structure of an oil sensor according to claim 1, further comprising a recessed part substantially surrounded by the sensor mounting part.

13. The mounting structure of an oil sensor according to claim 1, further comprising at least one boss integrally formed in the rib.

14. The mounting structure of an oil sensor according to claim 13, wherein the at least one boss includes a bolt passing therethrough.

15. The mounting structure of an oil sensor according to claim 1, wherein the sensor mounting part has a thickness greater than a thickness of the bottom portion of the oil pan.

16. The mounting structure of an oil sensor according to claim 1, wherein the sensor mounting opening is formed in a center of the mounting part.

17. The mounting structure of an oil sensor according to claim 1, further comprising at least one projection provided between the sensing part and the sensor mounting opening.

18. The mounting structure of an oil sensor according to claim 1, wherein the mounting part has a hexagonal box shape and is fitted in the sensor mounting opening.

19. The mounting structure of an oil sensor according to claim 1, wherein the rib surrounds a side portion, in a mounting direction, of the mounting part of the oil sensor over a substantially entire circumference.

\* \* \* \* \*